3,198,052
APPARATUS FOR MACHINING ELONGATED
SECTIONS OF MATERIAL
Sven Eric Persson, Stow, Ohio
(Erikslustvägen 23, Malmo 20, Sweden)
Filed Mar. 14, 1963, Ser. No. 265,175
2 Claims. (Cl. 83—516)

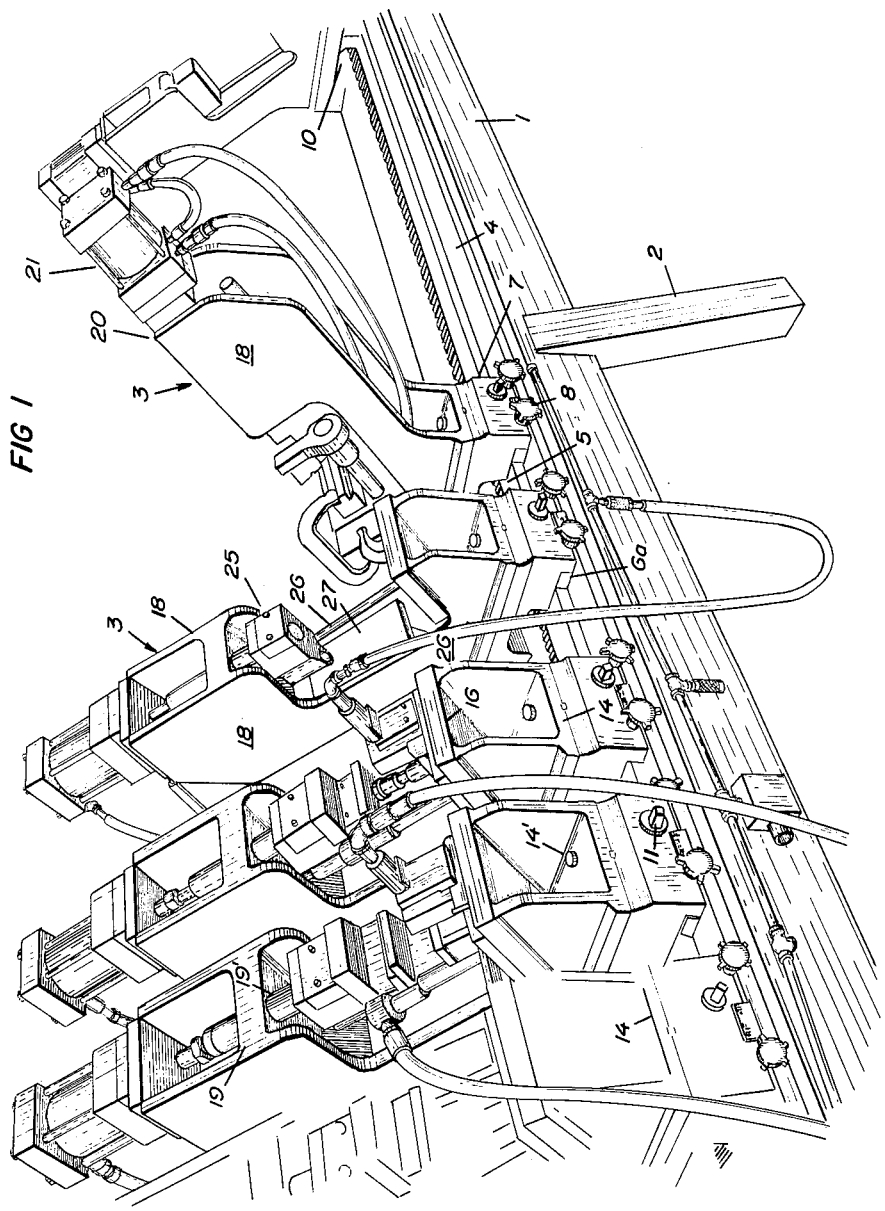

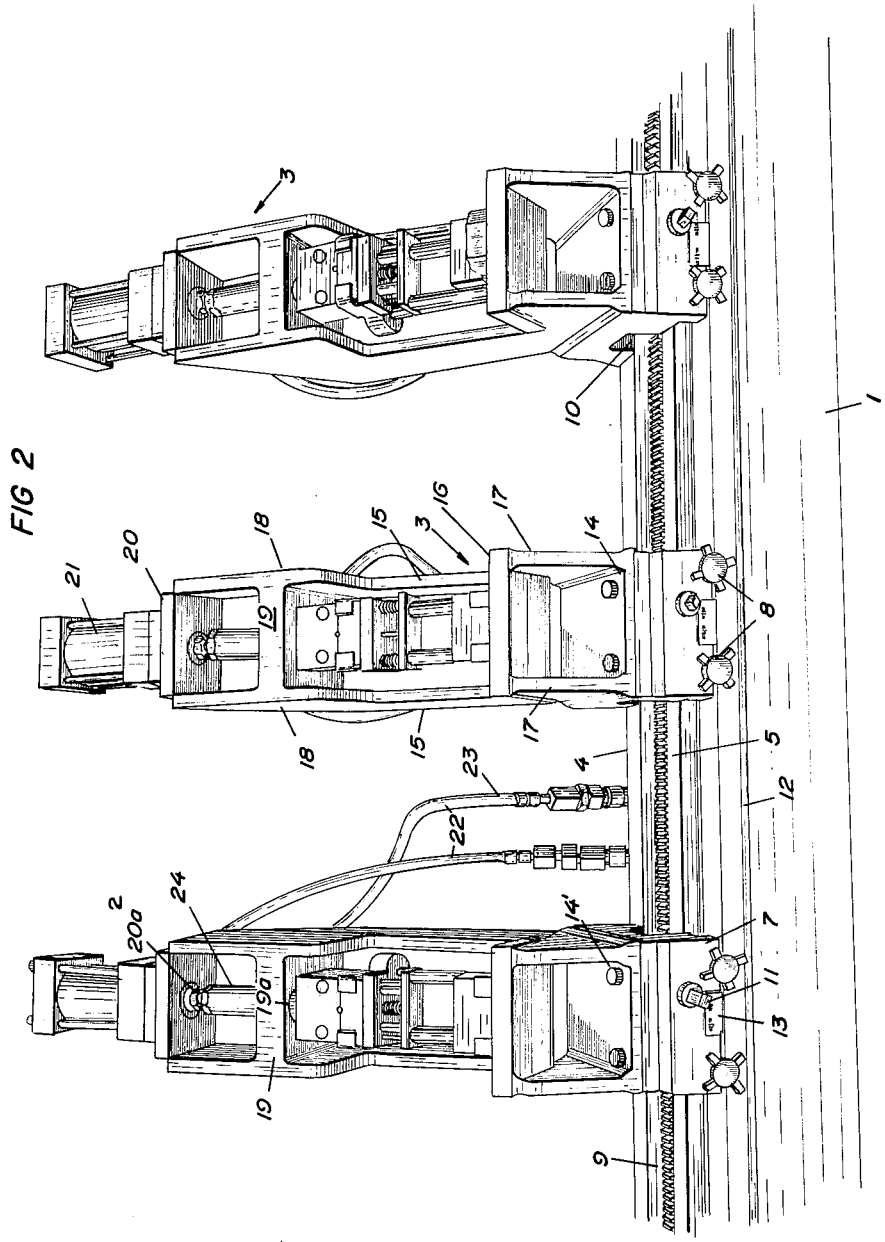

The present invention relates to processing elongated sections of material in which holes are to be punched or notches formed at several positions along the length of the sections of material.

At present, bars or strip such as aluminum extrusions are notched, punched or operated upon with various machines having fluid or mechanically operated punches in which a die has been placed that contains the configuration that is to notch or punch the aluminum extrusions. If several holes or notches are required, the extrusion has to be inserted in the machine several times at the different positions where the holes or notches are to be formed in relationship to each other and if close tolerances are needed, this procedure is very time consuming, difficult, and most often inaccurate.

The present invention has been made to solve the above explained prior art problem and includes a long bed on which work holders have been mounted so that when the long extrusion is placed in the work holders, the holes, notches, or other desired formations can be made relatively at the same time when the tool carriers mounted on the work holders are actuated by a mechanical or fluid operated means. Each tool is mounted on a tool carrier of a work holder that can be moved to the correct location on the bed of the machine and can be shifted to other locations when different extrusions are processed and the holes, notches, or other formations are to be located in different relationship to each other. The tool carrier preferably has a hydraulic cylinder to actuate the tool thereon.

The work holders and the tool carriers are so disposed relative to a carriage therefor that the tools are disposed at an angle of about 45° to the vertical. By rotating a work holder through an angle of 180° about a vertical axis, the tools of the rotated work holder will be disposed at an angle of 90° relative to the tools of the unrotated work holders thus making it possible to notch or punch the extrusion on surfaces perpendicular to each other.

An object of the present invention is to simultaneously provide in a long section of material holes or notches without having to move the section of material.

Another object of the present invention is to provide a device having a plurality of work holders equipped with tool carriers and movable with respect to each other to enable a long section of material to be accurately machined without having to move the same.

A further object of the present invention is to provide a plurality of work holders equipped with tool carriers selectively arranged at different angular positions with respect to each other.

Further objects of the present invention will appear from the following description taken in conjunction with the accompanying drawings in which:

FIG. 1 is a perspective view of a machine embodying the present invention; and

FIG. 2 is a front elevational view of the machine.

Referring now to the drawings, there is shown an elongated base 1 suitably mounted on legs 2 which engage the floor. The long base 1 has a bed 4 on which a plurality of work holders 3 are adjustably mounted with respect to the bed 4 as well as with respect to each other.

The work holders 3 are detachably mounted on carriages 7 which are movably mounted on bed 4 by means of a well-known dovetail arrangement wherein the male part 5 is an upstanding rib-like guide of dovetail cross section disposed on bed 4 and extending the length thereof while the female part 6 is a slot of dovetail cross section provided in the bottom of the movable carriage 7 of the work holders 3. Of course, the female part 6 could be provided on the bed 4 while the male part 5 could be provided on the carriage 7 if desired.

As shown, one wall of the dovetail slot 6 comprises a laterally adjustable clamping member 6a which may be moved from free to clamping position to grip rib 5 by suitable screws provided with actuating knobs 8 so as to lock and unlock the carriages 7 of work holders 3 at various positions along bed 4.

A rack 9 is provided on rib 5. A pinion (not shown) is mounted within channel 10 of the carriage 7 and meshes with rack 9. The pinion is mounted on shaft 11 which is mounted in carriage 7 and the portion that is shown extending outside carriage 7 has a polygonal configuration, such as rectangular, on which there can be removably mounted a crank member so as to rotate the shaft 11 in order to move the carriages 7 of work holders 3 along bed 4.

A scale 12 is mounted on base 1 adjacent the line of travel of the carriages 7 of the work holders 3, and a pointer 13 is mounted on each carriage 7 in order to properly and accurately position the work holders 3 along the bed 4.

The work holders 3 have a configuration resembling a C-clamp but can have any other desired configuration. Each work holder 3 includes a base portion 14 detachably mounted on carriage 7 and capable of being rotated or pivoted about a vertical axis relative to carriage 7 through an angle of 180° between positions such as that represented by the holder 3 at the extreme right of FIG. 1 and the other holders 3 shown in FIG. 1. Two parallel side members 15 of general C-shaped formation are mounted on base 14 in such a manner that they are disposed at an angle thereto of about 45°. Other angular dispositions of members 15 with respect to portion 14 can be utilized if desired.

A work table 16 is mounted on portions 17 of side members 15 above base 14 normal to the axis of the disposition of the side members 15. Side members 15 include upper portions 18 whose upper surface is disposed in the same longitudinal plane as that of the upper surface of work table 16.

Portions 18 have disposed therebetween a guiding and spacing part 19, and at the outer end of portions 18 there is mounted a support member 20.

A cylinder 21 is mounted on support member 20. Fluid pressure and exhaust conduits 22 are connected to a fluid supply means (not shown) disposed along bed 4 by conventional coupling means 23. A piston (not shown) is movably mounted in cylinder 21 and has connected thereto one end of ram 24 through an aperture 20a in support member 20. The ram 24 passes through an opening 19a in member 19 so as to be guided thereby.

A tool carrier 25 is mounted on the other end of ram 24. Tool carrier 25 is provided with conventional means (not shown) to secure a tool thereto.

Side members 15 include intermediate portions 26. A spacing member 27 is disposed between intermediate portions 26.

The tool carrier 25 moves from guiding and spacing part 19 toward work table 16.

The base portion 14 is mounted on carriage 7 so that work holder 3 can be moved about a vertical axis through an angle of 180° with respect to carriage 7 as shown in FIG. 1. Bolts 14' engage threaded holes in carriage 7 to secure work holder 3 on carriage 7 in a desired position.

A pivot pin (not shown) or other means can be provided to facilitate proper location of work holder 3 on carriage 7.

In operation, a long piece of material, such as a bar or strip of extruded aluminum in the form of an angle or channel member to be used to form a member or a portion of a sash or frame of a window or door in which circular holes, oblong holes, rectangular holes or holes of any desired configuration are to be machined in surfaces perpendicular to each other, is selected. The work holders 3 are moved to the proper selected position along bed 4 by rotating shafts 11 so that pointer 13 points to the proper position on scale 12. The carriages 7 of the work holders 3 are locked on bed 4 by turning knobs 8 which causes part 6a of the dovetail groove 6 to tightly clamp against rib 5. The work holders 3 if not properly oriented to form holes in the desired surface of the bar to be machined are pivoted through an angle of 180° before being moved to their selected position and locked thereat. After the work holders are moved to and locked in their proper positions along bed 4, the selected piece of material is clamped on work tables 16 by any conventional well-known means (not shown). The work holders are so constructed that regardless of the position into which they are rotated, the work tables will be properly positioned to receive the bar, strip or other stock to be held thereby while being machined. The proper tool is secured in tool carrier 25 and the fluid supply means is energized to supply fluid to the cylinders 21 through fluid supply and exhaust members 22 in order to move the rams 24 and tool carriers 25 simultaneously, thereby forming in one operation the desired number of holes or notches throughout the length of the work piece at the proper locations. Further material can be machined in like manner thus providing a large number of duplicated properly machined pieces rapidly. When the desired number of pieces have been punched or otherwise machined, and a new pattern is necessary on other pieces of material, the above procedure is repeated for the machining of the new pieces of material.

The tools employed can be hole forming means such as punches as shown. The tools can also be hole forming means such as drills. When drills are employed means for rotating the same can be carried by the rams.

Having described my invention, I claim:

1. Apparatus for machining workpieces, comprising a bed, a plurality of work holder means having base portions supported on the bed, the base portions of said plural work holder means having a common midplane, the work holder means extending upwardly and outwardly from said midplane at an angle of about 45°, means releasably securing said base portions selectively in either of a pair of positions 180° apart, said positions having a plane of symmetry relative to each other that coincides with said midplane, tool carrier means carried by each work holder means, and means for reciprocably moving said tool carrier means along a line disposed at an angle of about 45° to said plane of symmetry.

2. Apparatus as claimed in claim 1, and means mounting said plurality of work holder means for individual movement along said bed parallel to said plane.

References Cited by the Examiner

UNITED STATES PATENTS

| | | | |
|---|---|---|---|
| 530,780 | 12/94 | Kingsbury | 83—516 |
| 634,304 | 10/99 | Mendenhall | 83—516 |
| 943,467 | 12/09 | Ruth | 269—61 |
| 971,514 | 10/10 | Bambauer | 83—466 |
| 2,745,186 | 5/56 | Faeber | 83—522 X |
| 3,111,054 | 11/63 | Tishken | 83—581 X |

FOREIGN PATENTS

| | | |
|---|---|---|
| 565,056 | 10/58 | Canada. |
| 757,636 | 2/54 | Great Britain. |
| 573,743 | 3/58 | Italy. |

ANDREW R. JUHASZ, *Primary Examiner.*

WILLIAM W. DYER, Jr., *Examiner.*